United States Patent [19]

Cheston, III et al.

[11] Patent Number: 5,526,413
[45] Date of Patent: Jun. 11, 1996

[54] ADVANCED INTELLIGENT NETWORK ACCESS BY CUSTOMER PREMISE EQUIPMENT

[75] Inventors: Frank C. Cheston, III, Potomac, Md.; James E. Curry, Herndon; Robert D. Farris, Sterling, both of Va.

[73] Assignee: Bell Atlantic Network Services, Inc., Arlington, Va.

[21] Appl. No.: 423,254

[22] Filed: Apr. 17, 1995

[51] Int. Cl.$^6$ .................................................. H04M 3/42
[52] U.S. Cl. ...................... 379/201; 379/207; 379/269; 379/112; 379/219
[58] Field of Search .................................. 379/201, 207, 379/210, 211, 212, 216, 220, 219, 221, 230, 265, 5, 67, 242, 112, 269

[56] References Cited

U.S. PATENT DOCUMENTS

| | | | |
|---|---|---|---|
| 4,580,011 | 4/1986 | Glaser | 379/112 |
| 4,720,850 | 1/1988 | Oberlander et al. | 379/90 |
| 4,756,019 | 7/1988 | Szybicki | 379/112 |
| 4,987,587 | 1/1991 | Jolissaint | 379/94 |
| 5,247,571 | 9/1993 | Kay et al. | 379/207 |
| 5,251,255 | 10/1993 | Epley | 379/242 |
| 5,271,058 | 12/1993 | Andrews et al. | 379/210 |
| 5,282,244 | 1/1994 | Fuller et al. | 379/230 |
| 5,311,572 | 5/1994 | Friedes et al. | 379/67 |
| 5,353,331 | 10/1994 | Emery et al. | 379/67 |
| 5,416,833 | 5/1995 | Harper et al. | 379/265 |
| 5,418,844 | 5/1995 | Morrisey et al. | 379/216 |
| 5,422,941 | 6/1995 | Hasenauer et al. | 379/212 |
| 5,425,090 | 6/1995 | Orriss | 379/230 |
| 5,425,091 | 6/1995 | Josephs | 379/201 |
| 5,426,688 | 6/1995 | Anand | 379/5 |
| 5,436,957 | 7/1995 | McConnell | 379/207 |

OTHER PUBLICATIONS

L. Alvarez Mazo, R. Larrocha and M. Martin, "General Characteristics of Intelligent Networks", *Electrical Communication*, 1989, vol. 63, No. 4, pp. 314–320.

The Building of Intelligent Networks, (Architecture and Systems from Alcatel), J. Dunogue, J. B. Kerihuel and M. Martin (commutation & transmission No. 2, pp. 5–22, 1989).

Personal Communications in the Intelligent Network, R. De Sadaba, (British Telecommunications Engineering, vol. 9, pp. 80–83, Aug. 1990).

Perspectives on the AIN Architecture, Roger K. Berman and John H. Brewster, (IEEE Communications Magazine, pp. 27–32, Feb. 1992).

Service Script Interpreter, an Advanced Intelligent Network Platform, Paul van Hal, Jan van der Meer, Nael Salah, (Ericsson Review No. 1, pp. 12–22, 1990).

Your Very Own STP, Harry Newton (Teleconnect, pp. 12–18, Aug. 1992).

*Primary Examiner*—Jeffery Hofsass
*Assistant Examiner*—Scott Wolinsky
*Attorney, Agent, or Firm*—Lowe, Price, LeBlanc & Becker

[57] ABSTRACT

Telecommunications calls exchanged between customer premise equipment (CPE) and a switched telephone network receive advanced intelligent network (AIN) treatment within the CPE and within the network. The overall processing operations are coordinated and integrated so that the CPE can draw upon the network for information and resources and the network can draw upon the CPE. An AIN architecture is employed in the CPE and in the network, and the signaling systems are interfaced to permit an exchange of signaling messages. Detection of a trigger event in the CPE, or by an AIN switch in the network, causes the call control unit detecting the trigger to formulate a request message soliciting information or a support action for the call processing to be continued. Because the signaling systems are interfaced, the request message, originating either within the CPE or within the network, can be directed to a service logic provider either within the CPE or within the network (e.g., an AIN integrated service control point, or ISCP). The request message may call for routing or other information, or it may express a need for support resources (e.g., a request that a voice announcement unit be made available). The required resource may be sought in the CPE or in the network. The service logic provider carries out a service logic program to produce the information required to continue processing, and that is forwarded to the requesting call control unit by way of the interconnected signaling systems, to continue the call processing.

81 Claims, 3 Drawing Sheets

ADVANCED INTELLIGENT NETWORK ACCESS BY CUSTOMER PREMISE EQUIPMENT

This invention relates generally to the processing of telecommunications calls that are exchanged between customer premise equipment (CPE) and a switched telecommunications network. In particular, the present invention relates to methods and apparatus for coordinating and integrating operations carried out in support of the calls, both within the CPE and in the network, especially as those operations are implemented in an advanced intelligent network (AIN) environment which is extended by the invention into the CPE.

BACKGROUND OF THE INVENTION

While the advanced intelligent network concept continues to evolve, it has now matured to the point where AIN networks are widely used. AIN networks provide network operators with considerable flexibility and economy in structuring their product offerings and providing their customers with numerous telephone conveniences and services. The typical AIN architecture allows the switched transport network to interact with database systems and other so-called intelligent peripherals for obtaining information, data and support operations. This occurs when the switching network is triggered to access the database or peripheral by some condition that arises when a telephone call is being processed. An AIN trigger will typically arise in an AIN-equipped switch, and that will cause the switch to refer to a database for information or service to support processing of the call. AIN databases are typically accessed via a common channel signaling system—a separate network used for out-of-band signaling. This architectural scheme is the basis for a diversity of network services.

AIN techniques are employed by both interexchange and local exchange carriers. For some applications, the attendant common channel signaling systems of multiple carriers have been interconnected so that signaling information can be exchanged for coordinating operations in support of certain telephone services involving both carriers. For example, an interexchange carrier's common channel signaling system and that of a local exchange carrier may be interconnected through a signal transfer point so that signals can be exchanged relative to special service telephone calls involving both carriers, examples of which are such things as "800" calls and calling card calls where number verification is needed.

Concomitant with the advances in AIN technology, significant advances have also been made in the customer premise equipment (CPE)—that apparatus which makes up the terminus equipment between which telecommunications calls are extended through the carrier networks. While CPE may be no more than a simple telephone, it also may be quite complex and include such things as private branch exchanges (PBXs), computers interconnected by local area networks (LANs), and other intricate arrangements of terminal equipment and peripheral devices (e.g., facsimile machines, video terminals, databases, and so forth). The make-up of CPE is diverse, and it continues to become more so. The composition of CPE used in a typical residential setting, for example, is changing rapidly as computers are increasingly used in the home, and as such things as video, information, and interactive services "on demand" begin to become commercial realities. The components of residential CPE, as is perhaps more typical in a business setting, may also be interconnected in a local area network. The CPE, both residential and commercial, has lately taken on the attributes of a network unto itself.

Although the combined advances in intelligent networking and customer premise equipment have together resulted in a very effective telecommunications system, the advances on the two sides have been made somewhat independently and not always with a view as to how the operations of each might be coordinated and integrated with the other for even more effective communications.

On the CPE side, the various internal operations and control of calling features may be carried out in various ways, but that is usually done internal to the CPE, or only after a call has been put to the network where AIN processing is available. Within the CPE the scope of operations is virtually always limited by the resources available. For example, certain CPE may be able to perform conference calling operations, or do voice recognition, or provide recorded vocal announcements to its users, but once the limited resources for these are exhausted by use, the function has to be denied until the required resource is freed up. There may be no alternative resources to turn to.

On the network side, as a rule, the AIN operations are carried out entirely within the boundaries of the network. A telephone call, for example, receives AIN treatment only after it enters the network (the "network" takes diverse forms, of course). Typically, the CPE, whatever its make-up, simply directs a call to the network, and only there does it receive whatever AIN treatment it may provoke within the network. Thus, there has been a need for better coordination between the CPE and network operations so that, for any particular service, operations in support of the telecommunications exchanged are carried out in a more seamless and integrated fashion. Because of the growing complexity of the CPE itself and because of the networking that is now being increasingly used internal to the CPE, there has also been a need for switching and AIN-like processing capabilities within the CPE.

More specifically, techniques are being sought that will allow the CPE to look both to the network and to its own resources for intelligence in controlling and routing telecommunications calls while they are being processed within the CPE, that will allow the CPE to derive intelligence from within the network and from within the CPE itself for routing and control of communications exchanged within its own confines, and that will allow the CPE to access and use resources that are available within the network in support of call processing conducted within the CPE. It has been desired that these same techniques operate conversely so that the network is facilitated in some cases to turn to the CPE for intelligence and resources for its use in processing telecommunications.

It is among the objects of the present invention, therefore, to provide methods and apparatus which will meet these needs; which can be used to coordinate and integrate operations carried out in support of telecommunications exchanged between CPE and a switched telecommunications network; and which can also be used for coordination and control of communications that remain within the CPE itself.

SUMMARY OF THE INVENTION

By the invention, telecommunications calls exchanged between customer premise equipment and a switched telephone network are afforded AIN treatment both within the CPE and within the network, and the overall processing operations are coordinated and integrated so that the CPE can draw upon the network for information and resources and the network can likewise draw upon the CPE. With an AIN architecture employed in both the CPE and in the network, the signaling systems of the two are tied together through an interface that permits the exchange of ancillary signaling messages. Preferably, on the CPE side, a CPE call control means is employed for conducting some part of the processing operations. As with AIN switches in the network, the CPE call control means is adapted or programmed to be responsive to AIN-like trigger events as a telephone call, for example, is being processed. The call control means that is employed depends on the nature and scope of the CPE; for larger installations it may be a PBX, for a residential installation it may simply be a personal computer programmed for handling telecommunications.

Detection of a trigger event in the CPE processing, or by an AIN switch performing the network processing, causes the triggered call control means to formulate a request message soliciting information or some support action in order for the call processing operations to be continued. Because the signaling systems of the CPE and the network are interfaced to each other, the request message, whether it originates within the CPE or within the network, can be directed to a service provider either within the CPE or within the network (e.g., an AIN integrated service control point, or ISCP). The request message may call for routing or other information or it may express a need for auxiliary support resources or equipment (e.g., a request that a voice announcement unit be made available). In the latter case the call control means seeks information for access to the resource or an indication that the resource will be provided. Regardless of the origin of the request, the required resource may be sought either in the CPE or in the network. The service provider, as in AIN processing, carries out a service logic program to produce the information that the call control means requires in order to continue its processing. The resultant information is forwarded to the requesting call control means by way of the interconnected signaling systems. Once the requesting call control means receives an indication that the triggering event has been satisfied, the call processing therein continues. For any given call, there may be multiple or repeated triggers encountered for completing the call processing.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
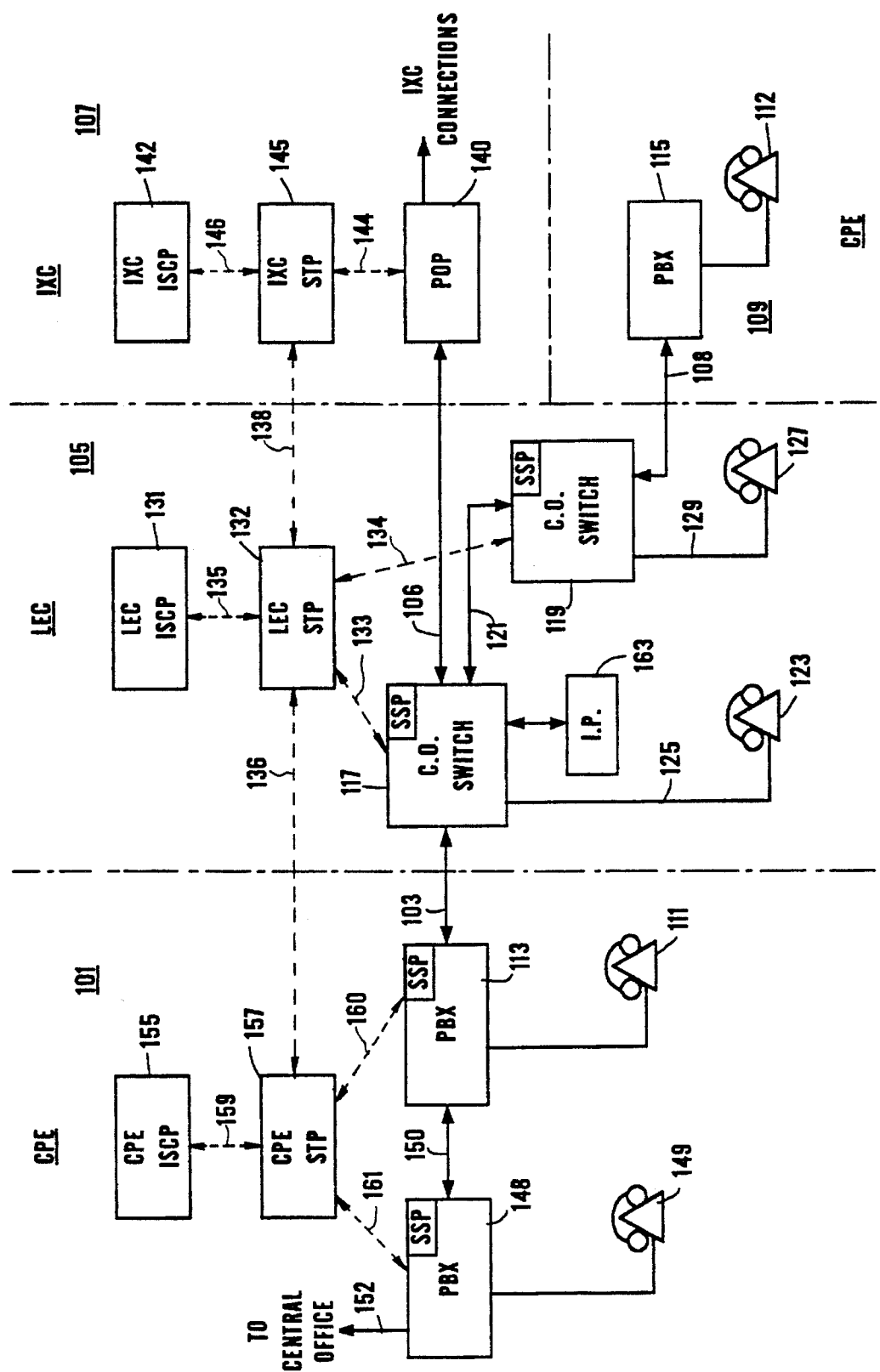
FIG. 1 is a simplified block diagram showing an arrangement of CPE interconnected with a switched telecommunications network for illustrating operation of the invention.

FIG. 1 very schematically illustrates one architectural framework for operation of the invention. That drawing broadly depicts an end-to-end telecommunications system made up of a first group of customer premise equipment (CPE) 101 having an interconnection 103 to a local exchange carrier (LEC) network 105. On the other hand, the LEC network 105 connects by trunking connection 106 to an interexchange carrier (IXC) network 107 and by connection 108 to a PBX within customer premise equipment 109. To accommodate the description of the invention, these parts of the generalized system are illustrated in FIG. 1 to be divided by dot-dashed lines. It will be understood, of course, that while the figure does not show the many interconnections and elements that necessarily make up a complex telecommunications system of this kind, it does show the essential details for developing an understanding of the invention, as will be appreciated by those of skill in the art.

It will be helpful initially to follow the path and processing of an ordinary telephone call within the system without involvement of the invention. For that purpose, it may be assumed that a caller desires to place a call from the telephone terminal 111, located within the CPE 101, to another telephone terminal 112, located within the CPE 109. As illustrated, CPE 101 includes a private branch exchange (PBX) 113 to which the originating telephone 111 is connected, and the CPE 109 includes a PBX 115 to which the called telephone 112 is connected. In the usual manner, when the telephone 111 goes off hook, a dial tone is provided from the PBX 113. With appropriate dialing from telephone 111, the call is connected to a central office switch 117 of the local exchange 105. The central office switch 117, recognizing that the call has to be passed to another central office switch 119 within the LEC 105, routes the call to that switch 119 by way of the interconnecting trunk 121. The terminating central office switch 119 then forwards the call to terminating PBX 115 which distributes it to the appropriate telephone, here telephone 112. Similarly, a call from telephone 111, for example, can be conventionally routed for this kind of "plain old telephone" service (POTS) to any of the other telephones illustrated, including telephone 123 connected to central office switch 117 via local loop 125, telephone 127 connected to central office 119 by way of local loop 129, and any other telephone (not illustrated) accessible by way of the interexchange carrier network 107.

The illustrated telecommunications system is also operational, however, for what is now rather conventional advanced intelligent network (AIN) call processing. For that, the central office switches 117 and 119 of LEC 105 are each operational as service switching points (SSPs) which, for AIN processing, simply means that these switches are each set up to detect call processing triggers that invoke intelligent network call processing services. An integrated service control point (LEC ISCP) 131 and elements of a common channel signaling system within LEC 105 support the AIN operations that are carried out within the LEC. The elements of the signaling system of immediate interest are the LEC signal transfer point (STP) 132 and connecting data links 133–135. Data links 133 and 134 connect the LEC STP to switches 117 and 119, respectively; data link 135 connects the LEC STP 132 to the LEC ISCP 131. The STP 132 is a node within the signaling network to facilitate the transfer of signaling messages within the signaling system. As will be more fully discussed below, additional data links 136 and 138 run from STP 132 into the CPE 101 and into the IXC 107, respectively.

The network ISCPs 131, 142 preferably are integrated systems. In such an implementation, an ISCP includes a Service Management System (SMS), a Data and Reporting System (DRS) and a Service Control Point (SCP) database system running Multi-Services Application Platform (MSAP) software. The ISCP also typically includes a terminal subsystem referred to as a Service Creation Environment or SCE, for programming the database in the SCP for the services subscribed to by each individual customer. The components of such an ISCP are interconnected by an internal, high-speed data network, such as a token ring network. Rather than operating full ISCP's of the type described, a number of local and interexchange carriers operate simpler systems serving only as SCPs.

The AIN operating principle is reviewed briefly below with particular emphasis on one exemplary call processing routine.

The path and processing of an AIN call from telephone 111 for the POTS call discussed above, initially goes through the PBX 113 to the central office switch 117 of LEC 105. Thus, whether the call is an AIN call or not, it is handled the same within the CPE 101. Any conventional AIN treatment the call is to receive only begins once the call enters the network (generally herein, except as will be clear from the context, "the network" may be considered to include any part of the telecommunications system beyond the CPE whose operations are being considered).

During call processing, the SSP capable switch 117 is able to detect a trigger (e.g., as from the dialed digits) indicating that the call requires additional information or instructions for completing the call processing. For example, if the call is an 800 call requiring the services of an interexchange carrier, the switch 117 will detect that trigger event from the dialed digits. In response, the switch 117 momentarily halts its processing of the call so that a determination can be made as to which one of the various interexchange carriers this particular call is to be handed off to (for simplicity, only one IXC network is illustrated). To do that, the switch 117 will launch a query message via the data link 133, through the STP 132, and the data link 135 to the LEC ISCP 131.

The query message gives the ISCP 131 information about the call and asks for directions in return as to which IXC to forward the call to. The ISCP 131 performs suitable logic operations and provides the identity of the carrier in a response message that is returned to the SSP 117 by way of the same data path. With the carrier identified, the SSP switch 117 resumes processing of the call. In the present 800 number example, the switch 117 passes the call to the interexchange carrier network 107, which is the carrier network identified in the response message. The call is then handed off to the IXC network 107, entering through the IXC's point-of-presence (POP) 140.

The POP 140 may itself be a switch having SSP capabilities, and it is assumed for present purposes that it does. Once received, the IXC carrier may need to route the call to a particular telephone (not specifically illustrated) where the call can be responded to. Typically, for an appropriate response, the exact phone may depend on the day of the week, the time of day of the call, and the geographical area from which it originates. To do that routing, the IXC switch of POP 140 is triggered to consult an IXC integrated service control point, such as IXC ISCP 142, for routing instructions. The switch of POP 140 thus sends a query message asking for those instructions to the IXC ISCP 142 by way of data link 144, IXC STP 145, and data link 146. These elements (data link 144, IXC STP 145, and data link 146), may be considered as elements of an IXC common channel signaling system. The IXC ISCP 142 responds to the query message by determining how the call is to be routed within the IXC 107 and sends the results of that back through the signaling system to the POP 140 in a response message. The switch of POP 140 then resumes its processing, taking action to route the call accordingly.

In summary, the basic AIN operating principle involves a switching system's retrieval of information and data, usually via a common channel interoffice signaling system, from a service element separate from the switch. A switch handling a call encounters some processing condition that requires information, data, or directions in order to continue the call. A service logic provider (e.g., a database system in the form of an SCP or ISCP) is accessed; and the information, data, or directions are obtained as a result of the service logic provider's performance of a service logic program. In practice, the service logic program may perform various operations, ranging from the simple retrieval of information from a data table to the performance of a complex operation in order to derive the required information.

Voice-band information on the lines and trunks constitutes 'in-band' information. Signaling data carried on the various data links and through the STPs constitutes 'out-of-band' information. The usual network signaling system is in accordance with what is known as Signaling System 7 (SS7), and the messages are in standard TCAP format. In some cases, the service logic provider may be in the form of an "intelligent peripheral" processor accessible by an SSP equipped switch without access through the signaling system.

The present invention, operative in connection with communications between CPE and a telecommunications network, provides the CPE with access to the intelligence of an AIN and extends the AIN operation into the CPE itself. This is discussed in connection with FIG. 1.

For illustrating the invention's operation, the first CPE 101 is shown in FIG. 1 to include not only PBX 113 and telephone station 111, but to further include another PBX 148 having connected to it a second telephone station 149. This illustrates a typical arrangement of PBXs in CPE that may be set up for, say, a large business (or other) organization. The two PBXs 113 and 148 are interconnected by connecting line 150. Similar to PBX 113, the second PBX 148 has a connecting path 152 into a telephone company central office so that calls can be exchanged with entities outside the CPE 101. The other central office to which PBX 148 is connected may be the same central office switch 117 that PBX 113 is connected to or it may be a different central office altogether (not illustrated).

Within CPE 101 the PBXs 113 and 148 each have access through a CPE signaling system to a CPE ISCP 155. In the CPE, the ISCP 155 may consist of some or all of the components of the network ISCPs 131, 142 described above, particularly for a large business customer operating two or more interconnected PBXs. However, for customers having more limited communications systems, the CPE ISCP 155 can take a much simpler form. The CPE ISCP can comprise a simple PC running some form of database software to provide a CPE SCP type database functionality.

The CPE signaling system, although not separately designated in the figure, is made up of CPE STP 157, connected on one side by a data link 159 to the CPE ISCP 155, and on the other side by separate data links 160 and 161 to PBXs 113 and 148, respectively. The CPE signaling system may be in accordance with Signaling System 7, although it need not be, and it can take various forms, as will be discussed.

The CPE signaling system is compatibly interfaced through the CPE STP 157 via the data link 136 to the LEC STP 132. Since the LEC STP 132 has an interconnection 137 to a signaling system of the IXC 107, the CPE signaling system is effectively interfaced and interconnected to a "network" signaling system. It will be understood that, although the CPE signaling system is here shown to be interconnected to the network signaling system by way of the data link interconnection 136 between the CPE STP 157 and the LEC STP 132, the CPE and network signaling systems can be also be interfaced by connections through other STPs within the network signaling system. For simplicity, these other possible interconnections are not illustrated. It is the purpose of the STPs to facilitate these signaling exchanges.

At this point it will be recognized that the combination of the CPE signaling system and the CPE ISCP 155, with connections into the two PBXs 113 and 148, provides an AIN architecture within the CPE 101 similar to that discussed above for the network to which the first PBX 113 is interconnected. This recognizable architecture, very suitable for discussion purposes here, may take a number of physical forms within the CPE as will be discussed further below.

For operation in the AIN environment that is established, the two PBXs 113 and 148 are each programmed with SSP capabilities. This means that each of the PBXs 113, 114 have the ability to detect AIN triggers and to perform AIN signaling and call processing functions in response to the trigger consequences. Thus when a call is being processed in one of these SSP adapted PBXs, if an AIN trigger is detected, the PBX will suspend processing of the call and launch a query message seeking directions or a signal for further processing. The directions (information, data, etc.) may be obtained from the local CPE ISCP 155. Notably, however, the query message may be alternatively directed into the network by way of the network signaling system, for potential acceptance by a targeted one of the ISCPs that is accessible from the network signaling system.

With access to the network signaling system and, consequently, to those things that are connected thereto, the CPE 101 has a vehicle not only for obtaining information and data from network based sources, but for calling upon network elements to obtain the use of certain supporting resources available within the network. Conversely, and equally notable, the network can be given access through the interconnected signaling systems to the information, data, and other supporting resources of the CPE 101. Again, for present purposes and for developing an understanding of the invention, the "network" is considered to be the entire network beyond the CPE whose operation is being considered, the elements of which are accessible by the network signaling system.

Generically, a call being processed within, say, PBX 113, either as an incoming call or as an outgoing call, may result in the occurrence of a trigger whenever a certain preprogrammed condition is encountered in the call processing. The PBX 113, as a call control means, recognizes the need for further information, data, or directions in order to continue the processing. The PBX 113 therefore launches a query message, through the data link 160 to be received initially at the CPE STP 157. The PBX 113 may direct the query message to the CPE ISCP 155, or the PBX may direct the query into the network for access to whatever is needed from one of the ISCPs accessible via the network signaling system (e.g., LEC ISCP 131). The CPE STP 157 directs the query message accordingly.

Once the query message is received by the appropriate service providing ISCP, a service logic program appropriate to the query is performed by the ISCP, and the results of that logic program are put into a response message. The response message is returned to the PBX 113 by way of the CPE and network signaling systems, interfaced to each other through the CPE STP 157. Upon receipt of the response message, the call processing is continued in the PBX 113.

For the same call, another triggering event might occur in, for example, the SSP switch 117. In that case, the switch 117 also launches a query message. However, in accord with the invention, the LEC switch 117 may launch the query to the CPE ISCP 155, as an alternative to the LEC ISCP 131 and the other network based ISCPs in the above-discussed 800 number example. That query message travels via the interfaced signaling systems, through the CPE STP 157. For an appropriate query message received from the network, the CPE ISCP 155 is also operative to carry out a logic program and to formulate the results thereof into a response message. That response message is returned to the switch 117 to initiate continued processing.

It is noteworthy that a response message from an ISCP (i.e., from one of the logic service providers) does not necessarily have to be directed to the call control means (e.g., switch 117 or PBX 113) that requested it, but the response message can be directed to other elements accessible by the interconnected signaling systems. That capability gives even more flexibility to the invention's operation.

As has been mentioned, it is a feature of the invention that resources can be shared between the CPE and the network. For that, the processing is not altogether different from what has just been described. In that case, the triggering event that occurs is a recognition, say, in the PBX 113 or switch 117, that some particular supporting resource is required in order for the call processing to continue. Among the things that might be considered as supporting resources are voice recognition units, conference bridges, announcement devices, and so forth. This is in contrast, for example, to the case wherein the call control means (PBX or switch) requires routing or control information in order to continue the processing.

If supporting resources are needed, as in any other case, the call control means is still triggered to launch a query message to the appropriate logic service provider (the appropriate ISCP), requesting that the needed support resources be provided. Also as in any other case, the logic service provider goes through a program of operation to determine the desired results. In the resource sharing situation, rather than coming up with routing or control information, the logic service provider produces results to cause the support resource to be made available (assuming there is not some total exhaustion of resources). The response message in that case may take a couple of forms, depending on the query message and the particulars of the logic service program performed by the ISCP. For one, the responding ISCP may send a response message to the network or to the CPE, as appropriate, directing that the needed resource be put into place, and send another response message to the switch or the PBX, as appropriate, advising, in effect, that the required support resource has been put into place and that call processing can therefore be continued. Alternatively, the responding ISCP may be programmed to return a response message that simply provides the PBX or switch (i.e., the call control means) with directions for obtaining connections to the support resource. The steps for making that connection are then carried out by the receiving call control means.

To more concretely illustrate the invention's operation, consider the relatively simple processing that might be needed for a call originating at telephone station 111 and dialed for placement to an international destination. It is assumed for that case that authorization to make international calls from station 111 must be established before the call is allowed, and that an attempt to place an international call if the station is not so authorized will provoke an automatic announcement advising the caller accordingly.

Initially, from the dialed digits received by the PBX 113 from the telephone 111, it is recognized that the call is an international call and that the authority for international calls to be placed from telephone 111 has to be determined in order for the call processing to continue. Those are the trigger conditions that provoke a query message to be formulated asking for a determination as to whether international calls can be made from station 111.

If an answer is required for any international call without regard to destination or other factors, it may be most convenient to program the system so that the answer is obtained from the CPE ISCP 155. On the other hand, if calls are to be approved on a country by country basis and perhaps with some other added qualifications (e.g., approved as a function of the time of day), then the CPE ISCP 155 may be inadequate. Under these later circumstances, it may be necessary to make use of the network intelligence, so that the operation for obtaining the answer is programmed into, for example, the LEC ISCP 131. In either case, the query message will contain enough information for the determination to be made. In the first case the query message is via data link 160 and the CPE STP 157 to the CPE ISCP 155 by data link 159. In the second case, the message is directed by the CPE STP 157 over the data link 136 to the LEC STP 132, and from there via data link 135 to the LEC ISCP 131.

The response message, containing the approval/disapproval answer is returned by the path taken by the query message. If the call is approved, the PBX 113 continues processing of the call toward completion. On the other hand, if the call is not approved, the processing resumes, but for the purpose of announcing to the caller that at least the international call of the moment cannot be completed.

The call processing that follows call denial illustrates the resource sharing aspect of the invention. For an announcement to be made telling the caller that the call cannot be made, the PBX 113 must obtain an announcement unit and connect it into the line to the calling station 111. The announcement unit may be an element of the Intelligent Peripheral 163 or a separate unit not specifically illustrated. For this, the PBX 113 may be triggered merely by the fact that an announcement is required or it may be triggered when it seeks a unit, otherwise normally available, and finds that the need cannot be fulfilled. The exact trigger will depend on the programming for that aspect of operation within the PBX 113. Once a trigger occurs, however, the PBX 113 will again formulate and send a query message asking, in effect, for the required resources to complete processing of the call. The query message may be directed to the CPE ISCP 155 or to a service logic provider accessible by the network signaling system (such as LEC ISCP 131). Which service logic provider is queried (at least initially) depends on the logic programmed into the operation of the PBX 113. For a rather simple operation of this kind, the CPE Switch would probably be first looked to. In either case, the receiving service logic provider runs the appropriate logic program and provides the results in at least one response message.

The result here could be, for example, that the required announcement unit is obtainable by appropriate connections from the PBX 113 to an announcement unit to be found in the second PBX 148 within the same CPE 101. Alternatively, however, the results might be such as to point to an announcement unit available at the local exchange carrier's switch 117, for example. For this kind of resource sharing, the response messaging may take either of two forms as was mentioned above. In this case, since the PBX is not already connected into the call, it will be preferable in most cases for the responding ISCP to simply provide directions in its response message that will enable the PBX 113 to make connections to the announcement unit in the second PBX 148. By contrast, were the call already connected into the switch 117 in some other call processing mode, for example, it would be preferable to send directions directly to the switch 117 for connecting the certain resource into the call. In the latter case, a response message is also sent back to the PBX 113 from the responding ISCP to confirm that the resource has been summoned and to signal to the PBX 113 to continue its processing. The result, in the example at hand, is to cause the announcement to be played to the caller, and the call to be processed to conclusion.

It will be recognized that more than one trigger may occur for a call being processed, and that the process will therefore be iterative or cyclical in some cases so that the steps outlined in these examples, and in the general case, may be repeated as needed for the call being handled. It will also be recognized that if support resources are requested from a first potential source (as from the second PBX 148 in the example just discussed) and if it turns out that those resources are not available, then they may be sought from other potential sources accessible via the interconnected signaling systems.

The arrangement described, permitting intelligence and resources to be shared between CPE and the network with which it interacts, and permitting better coordination and integration of operations, provides a basis for numerous advanced telecommunications applications. Those of skill in the art will readily recognize this, and various specific uses will be apparent to them. Thus, although a discussion of the full range of possible applications is not needed, to further describe the invention, and to illustrate the flexibility and versatility that it offers, a few other applications of it are nevertheless briefly described.

In FIG. 1, for example, there may be a need or desire to provide speech recognition capabilities in connection with the operation of the PBX 113 that is part of the CPE 101. Ordinarily, PBXs are without these capabilities, but they are becoming rather common in the networks of local exchange carriers. Here the PBX 113 is given the ability to reach into the network and plug the required speech recognition capability into a PBX call processing routine. In this case, the central office switch 117 has access to an intelligent peripheral (IP) 163 which does have the ability to do voice recognition (e.g., to interpret spoken words). To gain these speech recognition capabilities for a call handled by the PBX 113, the PBX is triggered in its call handling to make a request for connection of the IP 163 into the call, at least during any time period when speech recognition capabilities are desired. For that, the PBX 113 sends a request (query) message, per its programming, to either the CPE ISCP 155 or to the LEC ISCP 131 and asks for an assignment of the IP 163 to the call.

Since the IP 163 is within the LEC network 105 and principally subject to that network's control, it is preferable that the request message be handled by the LEC ISCP 131. But, notably, that need not be the case. Either way, the cognizant ISCP can respond by either sending a response message to the switch 117 directing it to make the connections of the IP 163 into the PBX 113 (and with confirmation from the ISCP to the PBX 113), or the ISCP can send a response message to the PBX 113 with directions for it to make connections into the switch 117 and to the IP 163. As was noted above, depending on the combined capabilities of the switch 117 and the PBX 113, the process may require more than a single trigger event in the PBX 113, and it may also require some repetition of the processing steps. Once the IP 163 is connected into the call and the PBX is made aware of the results of its request, the call processing continues.

To further illustrate by example, the invention can facilitate conference calling in the event the PBX 113 by itself cannot provide that feature, either because it has already exhausted its conferencing resources or because it is without such resources in the first place. When a conference call is being set up in the PBX 113, a lack of an available conference bridge for bringing the conferees' lines together will be recognized by the PBX (the relevant call control means in this example) as a trigger that this resource is needed to further the processing of the call. The PBX 113 will, according to its programmed operation, send a query message to the CPE ISCP 155. This query, in effect, asks that a determination be made for furnishing directions for connecting an available conference bridge into the call that is being set up. The query message is appropriately coded to indicate what is needed. Alternatively, as is now clear, the operation may be arranged such that some logic service provider other than the CPE ISCP 155 (e.g., such as LEC ISCP 131) be consulted for the required directions.

Assuming the determination is to be made by CPE ISCP 155, upon receipt of the query message, that ISCP carries out the particular logic service program that is invoked by the query message and provides the results in a response message. The initial results could refer the PBX 113 to the second, interconnected PBX 148 in the CPE 101 for the needed conference bridge, with directions for interconnecting thereto. Alternatively, the results could refer PBX 113 to a conference bridge accessible in the network for use in setting up the call (say, from the switch 117 in the LEC 105), also with connection directions.

It will be noted that, should the supporting resource sought (here, a conference bridge) not be available in the facility to which the PBX 113 is directed, then the process can operate iteratively to determine alternative facilities for providing the needed resource. That is, for example, should the required conference bridge not be available within the second PBX 148, the first PBX 113 can be re-triggered to again query the appropriate logic service provider (ISCP) for directions to an alternative facility where a conference bridge can be accessed for the call. The messaging capabilities inherent in the invention provide for this, and the implementation is a matter of suitable programming by reasonably skilled programmers.

With a slightly different character to its operation, the invention also has the ability to provide a "work at home" subscriber with telephone services that have the same characteristics as those available at the subscribers place of business. Although a CPE structure that is more likely to be applied in a residential setting is discussed below in connection with FIG. 3, for ease of explanation, reference to FIG. 1 will continue. Operationally, for work at home, a first trigger occurs when a calling feature is invoked. As an example, the subscriber may have a speed dialing feature in his office which is also to be provided in the work at home setting. It will be recalled that speed dialing allows a caller to make a call by dialing as little as a single digit. A speed dialing input, for example from telephone 111, will be detected as an AIN trigger by a call controller, which, as far as the invention is concerned and for explanation purposes, is equivalent to PBX 113. The call controller (i.e., PBX 113), by way of the interconnected signaling systems, sends its query message to the LEC ISCP 131. The query message includes indications of the caller's speed dial digital entry and the identity of telephone station 111, along with an indication that a speed dialing request is to be serviced, and other indicia as required. The LEC ISCP 131 translates the speed dial digital entry into a directory telephone number. That number is returned to the call control means in a network response message, providing information for call placement and routing.

As an added feature, however, the programming of the LEC ISCP 131 may be such that the directory number is sent, not to the home-based call controller, but to the central office switch (e.g., switch 117) of the local exchange carrier that ultimately handles the call anyway. That kind of arrangement gains efficiency and saves time in the call set-up process. Other features of the subscriber's office telephone services may similarly be called forth by accessing the intelligence of the advanced network in the manner facilitated by the invention.

As noted above, the network can access the logic in the CPE ISCP 155. Consider now a 'work at home' example wherein the location corresponds to telephone 123 serviced by the LEC system 105, and the CPE ISCP 155 stores the call processing records for the customer's normal business telephone service. When the subscriber activates telephone 123 to obtain the business service, e.g. the business related speed dialing feature, the LEC switch 117 detects this event as an AIN trigger. The call controller (now switch 117) sends its query message to the CPE ISCP 155. The query message includes indications of the caller's speed dial digital entry, the identity of telephone station 123, an indication that a speed dialing request is to be serviced, and any other indicia required. The CPE ISCP 155 translates the speed dial digital entry into a directory telephone number and returns that number in a call control message to the switch 117 serving as the call control means. In response, the switch 117 proceeds with call completion in the normal manner.

Again as an added feature, the programming of the ISCP (now ISCP 155) may cause transmission of the directory number, not just to the home-based call controller, but to the call controller that will ultimately handle the call. In the present example, the directory number from the speed dial feature may correspond to another of the telephones of the business customer served by CPE system 101, e.g. to telephone 149. The ISCP 155 therefore would provide an instruction to the PBX 148 to complete the call.

Although shown in FIG. 1 as telephones and described as such above, the various terminal devices can comprise any communication device compatible with the respective telecommunication line. Where the line is a standard voice grade telephone line, for example, the terminals could alternatively include facsimile devices, modems etc. Also, the illustrated links to the individual terminal devices may comprise lines, as shown, or wireless communication links.

Figure 2:
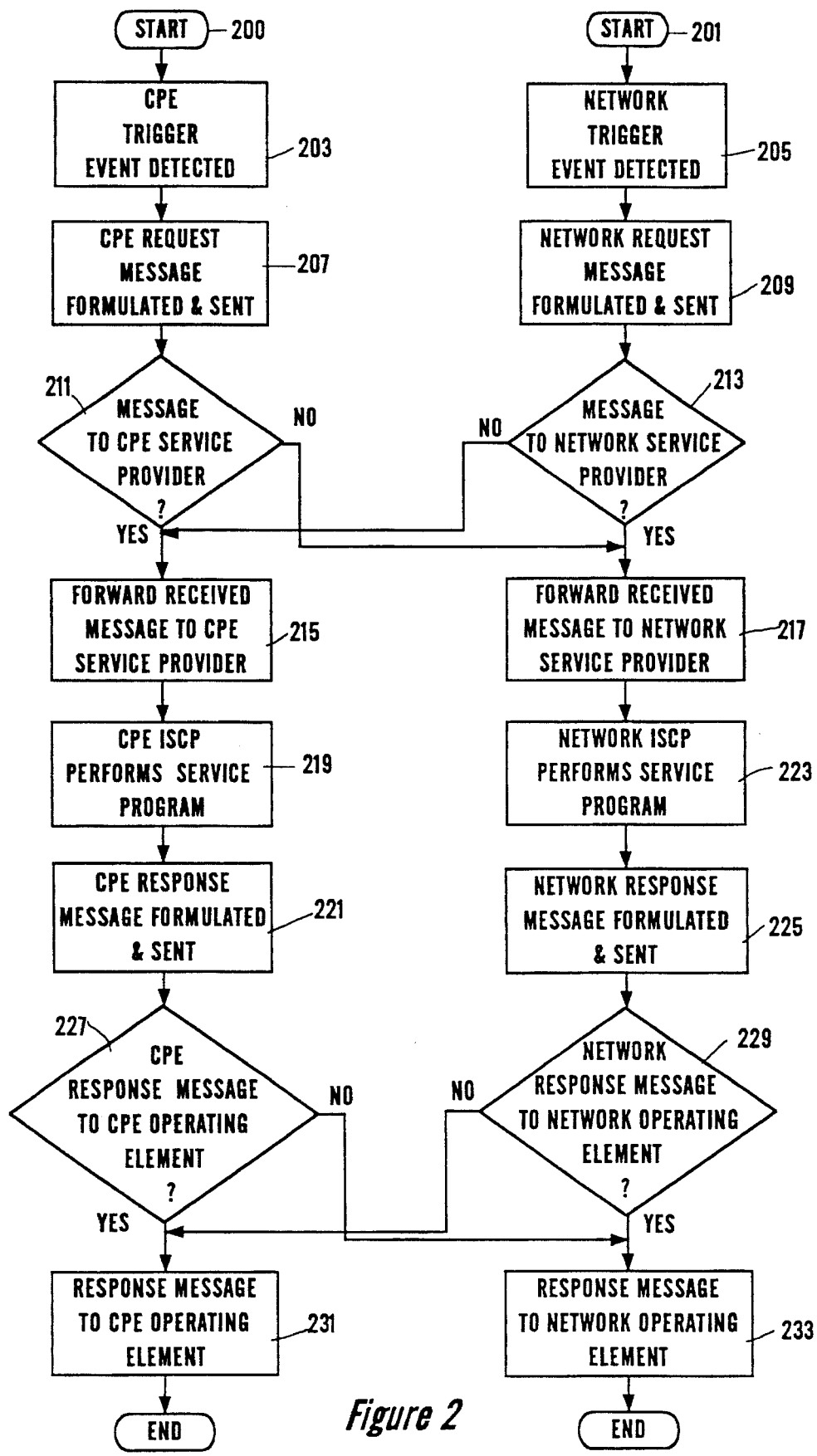
FIG. 2 is a simplified block flow chart illustrating call processing carried out in accordance with the invention.

The flow chart of FIG. 2, taken in connection with FIG. 1, very generally summarizes certain important operations that take place as these various features and services are implemented by the invention. Because the process may be independently initiated either from within the CPE or from within the network, there are two potential starting points for the operation, indicated as starting points 200 and 201, respectively. The processing subsequently becomes intertwined.

In either case, a trigger event initiates the operation. A CPE trigger event will be detected in step 203 and a network trigger event will be detected in step 205. As was discussed above, both generally and in connection with certain of the operating examples, the trigger event and its detection will typically take place within a call control means which is carrying out at least some part of the telecommunications. Within the CPE, an example of a call control means is the PBX 113; within the network, an example is the SSP adapted switch 117. The trigger event itself relates to a processing condition for which a supporting action, including the determination of information, is required for the processing to continue. This includes the need for auxiliary, or shared, resources in order to process the telecommunications being handled. When there is a trigger condition calling for resources of some kind, the information sought by the call control means is either an indication that the resource called for has been provided (as being connected into a call, for example) or directions for making connections to the needed resource.

Once a trigger condition is detected by either the CPE call control means or the network call control means (or both), depending on which one has been triggered, that call control means momentarily suspends its processing of the telecommunications call being handled and formulates a request (or query) message by which the information or data required for furtherance of the processing is sought. Step 207 provides for the CPE call control means to formulate and send out a CPE request message if it is triggered. Step 209 provides for the network call control means to formulate and send out a network request message if it is triggered. From whichever control means it arises, the message is directed to an appropriate logic service provider, such as either one of CPE ISCP 155 or LEC ISCP 131 and the message is addressed accordingly.

The network signaling system and the CPE signaling system interface to each other to facilitate the cross-routing via signal transfer points (e.g., STPs 132 and 157 of FIG. 1). Consequently, a CPE request message can be directed to either a logic service provider within the CPE or within the network, and similarly, a network request message can be directed to a logic service provider either in the CPE or in the network. Operationally, the cross-directing of request messages is reflected, first, in decision block 211 where, effectively, it is determined whether a CPE request message will be directed to the CPE ISCP 155 or to the LEC ISCP 131, and, second, in decision block 213 where it is determined whether a network request message will be directed to the CPE ISCP 155 or to the LEC ISCP 131.

The signal transfer points through which the network signaling system and the CPE signaling system are interfaced can receive request messages regardless of origin, whether in the CPE or in the network. Thus, step 215 allows for the receipt of both CPE request messages and network request messages and for each received request message to be forwarded to the CPE service logic provider CPE ISCP 155. Similarly, step 217 allows for the receipt of both network and CPE request messages and for each received request message to be forwarded to the network logic service provider, which, in this case is LEC ISCP 131.

Within the CPE, at step 219, the CPE ISCP 155 carries out the service logic program that is provoked by the received request message. The CPE ISCP 155 thereby comes up with information elicited by the request message, which is either call control information (which may be call routing information) or directions for setting up a needed auxiliary support resource. A CPE response message containing the information is formulated and put out to the CPE signaling system at step 221. If the directions for setting up an auxiliary resource are directed to other than the requesting call control means, another response message may be sent to that call control means to inform it that the requested resource has been called for (that step is not specifically shown) and that call processing can be resumed until another trigger is detected (which may occur, for example, if the need for a resource remains unmet). To the same effect, within the network, at step 223, the LEC ISCP 131 carries out a logic service program in response to any request message it may receive, producing the same kind of information. One or more network response messages containing that information are formulated and sent out on the network signaling system at step 225.

As with request messages, response messages can be cross-routed by virtue of the interfaced signaling systems. A CPE response message can be directed to an operating component addressable either within the CPE or within the network. Similarly, a network response message can be directed to an operative element addressable either in the CPE or in the network. In most cases, a response message will be directed to a call control means so that its call processing operations can continue. That is not the case for every response message, however, since some response messages may be directed to operative elements as needed to implement the sharing of resources as has been described. Operationally, this cross-routing is reflected, first, in decision block 227 where, effectively, it is determined whether a CPE response message will be directed to an element of the CPE 101 or to an element of the LEC 105, and, second, in decision block 229 where it is determined whether a network response message will be directed to an element of the CPE 101 or to an element of the network.

Thus, step 231 allows for the receipt of both CPE response messages and network response messages and for each received request message to be forwarded to an element of the CPE. Similarly, step 233 allows for the receipt of both network and CPE request messages and for each received request message to be forwarded to an element of the network. If the receiving element is a call control means awaiting the information contained in the response message, then it uses the information content to cause its call processing operations to continue.

Figure 3:
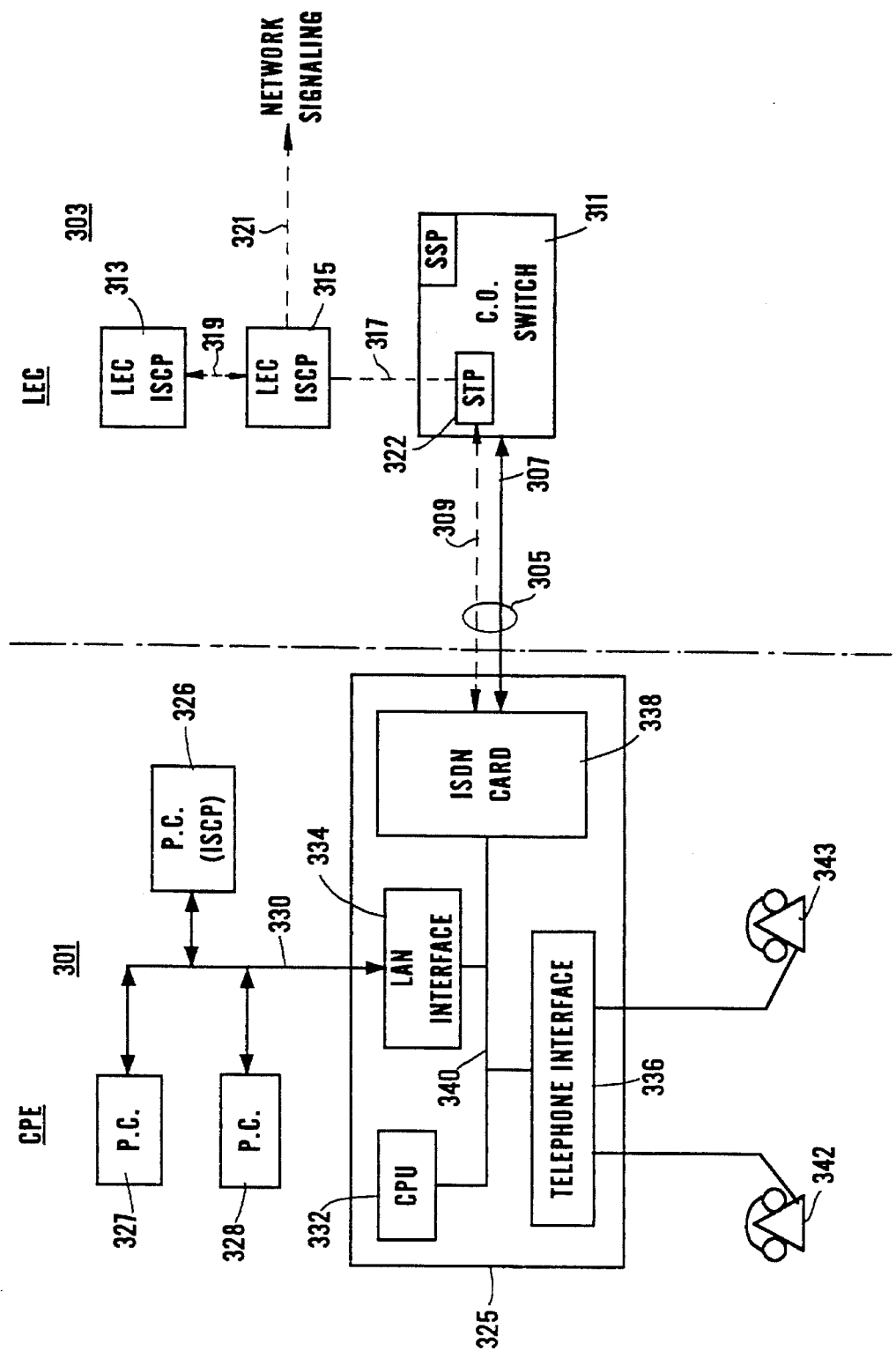
FIG. 3 is a block diagram showing one form of the inventions it might be employed in a residential CPE operation.

The CPE arrangement illustrated in FIG. 1 is representative of what might prevail in a commercial or other sizable telecommunications setting. It is presently unlikely that residential, or in-home, CPE would include PBXs and signaling systems in accordance with Signaling System 7. FIG. 3 is illustrative of a more typical residential CPE arrangement for the invention.

The residential CPE 301 illustrated in FIG. 3 interconnects to a local exchange carrier network (LEC 303) by an ISDN (Integrated Service Digital Network) connection 305 (or, generally, a voice over data connection). Accordingly, the connection 305 includes at least one standard B-channel 307 (bearer) and a D-channel 309 (data). The D-channel provides out-of-band signaling capabilities between the CPE and the LEC.

On the LEC side, the ISDN connection 305 is into a central office switch 311 which is adapted for AIN operation as an SSP. The LEC 303 also includes an ISCP 313 interconnected by a LEC signaling system to the switch 311. The LEC signaling system includes an STP 315, interconnected on one side by data link 317 to the switch 311, and on the other side by data link 319 to the ISCP 313. The LEC STP 315 also has connections 321 into other signaling system elements (not illustrated) comprising, overall, a network signaling system. Within the switch 311, the out-of-band-signaling link 309 is interconnected into the LEC signaling system by a signal transfer point (STP) 322. As will become clear, the LEC signaling system is interfaced to the residential CPE signaling system (to be discussed).

The CPE 301 is configured as a group of personal computers (PCs) (or other devices, such as video terminals, etc.), including a first PC 325, and other PCs 326–328, interconnected to each other in a local area network (LAN) arrangement. The PCs 325–328 are communicably tied together by LAN bus 330.

The first PC 325 is arranged to connect directly to the ISDN connection 305 as well as to the LAN bus 330. Internally, the PC 325 includes a central processing unit (CPU) 332, a LAN interface circuit 334, a telephone interface circuit 336, and a standard ISDN interface circuit card 338. These various units are interconnected together and are communicable through an internal system bus 340. Although not shown, it will be understood that the PC 325 also includes memory and other standard operating components. The CPU 332 generally controls overall operation in accordance with a stored program of operation, taking input and output signals into account in the operation.

The ISDN card 338 provides an interface for compatibly connecting the PC 325 to the ISDN connection 305 and thus to the telephone office switch 311. Interfacing connections such as those provided by the ISDN card 338 are well understood and cards suitable for such use are readily available commercially from a number of sources. The telephone interface card 336 permits telephones, such as phones 342 and 343, to connect into the PC 325, and to communicate through the LEC 303 via the ISDN card 338 and the connection 305.

The LAN interface 334 connects the PC 325 into the LAN bus 330 to facilitate communications within the local area network. The LAN bus 330 may operate in accordance with any number of known protocols suitable for residential use. Physically, the LAN bus 330 may be a coax cable, a twisted pair of wires, etc. The PC 325 can communicate through the LEC 303 via the ISDN card 338 and the connection 305. The other PC's can communicate through the LEC 303 via the LAN interface 334, internal bus 340, the ISDN card 338 and the connection 305. One of the PCs connected into the LAN bus, PC 326 for example, may be configured to function as a logic service provider (an ISCP) as has been described above in connection with the other figures.

The LAN bus 330, the LAN interface 334, the PC bus 340, and the ISDN interface card 338 provide a signaling system within the CPE 301. This CPE signaling system is interconnected or interfaced to the LEC signaling system by the out-of-band D-channel signaling link 309 and the signal transfer connection 322 within the switch 311.

Operation is analogous to what has been described above in connection with FIGS. 1 and 2. For example, to process a telephone call originating at telephone 342, the CPU 332 will cause operations internal to the PC 325 to be conducted which are directed at furthering the call. In that sense the CPU serves the purpose of a CPE call control means. The programming is such that a trigger condition, in the manner discussed above, will cause the CPU 332 to launch a query for information or support in order to continue the call. A trigger may occur, for example, because routing information is needed in furtherance of the call. In that event, the CPU 332 will cause a request message to be formulated for eliciting that information.

By the connections established and the interfaced signaling systems, the information needed may be sought either from the LEC ISCP 313 or from the logic service provider PC 326. If the routing information is relatively simple (e.g., a speed dialing number), the preference is that the information be obtained from the PC 326. By a suitably formulated request message, the CPU 332 addresses the PC 326, via the LAN interface 334 and the LAN bus 330. The PC 326 performs a program to look up the routing information and to cause it to be returned in a response message to the PC 325. With the routing information in hand, the CPU 332 continues the call processing.

It may occur later in processing the same call, however, that support resources are needed for some other aspect of the call. For example, it may develop that conference calling capabilities are needed which cannot be met from within the CPE 301. In that event, the CPU will again be triggered to seek the use of supporting resources for setting up that part of the call. A conference bridge may be needed, for example. For that, the CPE 301 may call upon the supporting resources of the LEC network 303. Upon the trigger that results, the CPU 332 will formulate and send a CPE request message, for example, to the LEC ISCP 313 seeking to have a conference bridge set up in the LEC switch 311. The message is sent by way of the signaling interface through the ISDN interface card 338, the D-channel data link 305, the switch-based STP 322, and up to the ISCP 313 through the STP 315. In response, the LEC ISCP 313 performs its program of operation, determines that a conference bridge can be expected to be available at the LEC switch 311 and then forwards a response message to the switch 311 with directions for connecting the requested conference bridge (not illustrated) into the call that originated from the telephone 342. If further processing is required in the PC 325, a response signal may be forwarded to it in furtherance of its processing.

Just as the CPE call control means may have access to the LEC ISCP 313 and other service logic providers and intelligent peripherals accessible from the LEC signaling system, a network call control means may have access to information and data from sources within the CPE 301, such as the ISCP running on PC 326, the other Pcs 327 and 328 and other devices connected into the LAN bus 330. It will be understood that, although the CPE 301 is depicted as being made up of separate and distinct components, it is within the scope of the invention to encompass all, or virtually all, of the operating elements of the CPE in a single unit or within a single computer.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. For use in connection with customer premise equipment (CPE) deployed to handle telecommunications calls exchanged with a switched telecommunications network of the type having a signaling system and a network service logic provider operative to perform network service logic programs to facilitate the provision of telecommunications services, a system for integrating and coordinating operations in support of the calls, comprising:

(a) a CPE service logic provider operative to perform CPE service logic programs and to provide results from the performance of any one of said CPE service logic programs in a CPE response signal;

(b) a CPE call control means for processing the telecommunications calls within the CPE and operative in processing each call to (i) detect at least one CPE processing condition that requires performance of one of said service logic programs in order to continue processing for the call, and to (ii) generate a CPE request signal calling for performance of said service logic program;

(c) a CPE signaling system by which signals are conveyed within the CPE; and (d) a signaling interface for compatibly interconnecting the CPE signaling system with the signaling system of the switched telecommunications network; whereby (i) if the required service logic program for the call being processed is to be performed in the CPE service logic provider, then the CPE request signal is directed to the CPE service logic provider, and (ii) if the required service logic program for the call being processed is to be performed in the network service logic provider, then the CPE request signal is directed to the network service logic provider.

2. The system of claim 1 wherein the network service logic provider is operative to provide results from its performance of any one of said network service logic programs in a network response signal, and wherein the CPE call control means is operative to receive the response signals from the CPE service logic provider and from the network service logic provider by way of the signaling interface and the CPE signaling system and upon receipt of the CPE response signal or the network response signal for the call being processed to continue processing that call.

3. The system of claim 2 further including a network call control means for processing the telecommunications calls within the network and operative in processing each call to (i) detect at least one network processing condition that requires performance of another one of said service logic programs in order to continue processing for the call, and to (ii) generate a network request signal calling for performance of the other service logic program, and whereby, if the required other service logic program for the call being processed is to be performed in the CPE service logic provider, then the network request signal is directed to the CPE service logic provider by way of the signaling interface.

4. The system of claim 3 wherein the network call control means is operative to receive the response signals from the CPE service logic provider and from the network service logic provider and upon receipt of the CPE response signal or the network response signal for the call being processed to continue processing that call.

5. The system of claim 4 wherein the CPE processing condition detectable by the CPE call control means is a need for information for use by the CPE in controlling the call, including routing thereof, and wherein the response signal received by the CPE call control means includes that information.

6. The system of claim 5 wherein the network processing condition detectable by the network call control means is a need for information for use by the network in controlling the call, including routing thereof, and wherein the response signal received by the network call control means includes that information.

7. The system of claim 4 wherein the CPE call control means is operative to detect as CPE processing conditions (i) a need for an auxiliary resource for use by the CPE in processing the call, and (ii) a need for information for use by the CPE in controlling the call; and wherein the network call control means is programmed to detect as network processing conditions (iii) a need for an auxiliary resource for use by the network in processing the call, and (iv) a need for information for use by the network in controlling the call.

8. The system of claim 7 wherein if condition (i) is detected, then the service logic program performed provides CPE directions for accessing an auxiliary resource for use by the CPE and the response signal received by the CPE call control means includes said CPE directions; wherein if condition (ii) is detected, then the response signal received by the CPE call control means includes the information needed by the CPE; wherein if condition (iii) is detected, then the other service logic program performed provides network directions for accessing an auxiliary resource for use by the network and the response signal received by the network call control means includes said network directions; and wherein if condition (iv) is detected, then the response signal received by the network call control means includes the information needed by the network.

9. The system of claim 8 wherein the auxiliary resource needed for use by the CPE in processing the call is located within the network, and wherein the auxiliary resource needed for use by the network in processing the call is located within the CPE.

10. The system of claim 9 wherein the CPE call control means is included in a private branch exchange (PBX) and the network call control means is a telecommunications switch located in a central office of the network and wherein the PBX is interconnected to the central office.

11. The system of claim 10 wherein the auxiliary resource needed for use by the CPE in processing the call is an adjunct device accessible by the telecommunications switch.

12. The system of claim 4 wherein the CPE processing condition detectable by the CPE call control means is a need for an auxiliary resource for use by the CPE in processing the call, wherein the required service logic program provides directions for accessing that auxiliary resource, and wherein the response signal received by the CPE call control means includes an indication that the need for such an auxiliary resource has been met.

13. The system of claim 12 wherein the auxiliary resource needed for use by the CPE in processing the call is located within the network.

14. The system of claim 12 wherein the network processing condition detectable by the network call control means is a need for an auxiliary resource for use by the network in processing the call, wherein the required other service logic program provides directions for accessing that auxiliary resource, and wherein the response signal received by the network call control means includes an indication that the need for such an auxiliary resource has been met.

15. The system of claim 14 wherein the auxiliary resource needed for use by the network in processing the call is located within the CPE.

16. A method for integrating and coordinating call processing operations conducted in support of a telecommunications call between customer premise equipment (CPE) and a telecommunications network of the type having a signaling system by which signaling messages are exchanged with various network service providers, comprising the steps of:

(a) detecting a CPE processing condition calling for performance of a supporting action productive of results required for conducting at least a portion of said call processing operations;

(b) formulating a CPE request signaling message for requesting performance of the supporting action;

(c) if the supporting action is to be performed within the CPE, then forwarding the CPE request signaling message to a CPE service provider having a capability for causing said supporting action to be performed, said CPE service provider being accessible by a CPE signaling system;

(d) if the supporting action is to be performed without the CPE, then forwarding the CPE request signaling message to a selected one of the network service providers having a capability for causing said supporting action to be performed, said network service provider being accessible by the CPE signaling system and the network signaling system;

(e) causing the supporting action to be performed by the service provider that receives the CPE request signaling message for production of said results;

(f) formulating a response message indicating said results and forwarding said response message to the CPE; and (g) using said results for conducting said portion of said call processing operations.

17. The method of claim 16 including the further steps of:

(h) detecting a network processing condition calling for performance of another supporting action productive of other results required for conducting at least another portion of said call processing operations;

(i) formulating a network request signaling message for requesting performance of said other supporting action;

(j) if the other supporting action is to be performed within the CPE, then forwarding the network request signaling message to a CPE service provider having a capability for causing said other supporting action to be performed;

(k) if the other supporting action is to be performed without the CPE, then forwarding the network request signaling message to a selected one of the network service providers having a capability for causing said other supporting action to be performed;

(l) causing the other supporting action to be performed by the service provider that receives the network request signaling message for production of said other results;

(m) formulating a response message indicating said other results and forwarding said response message to the network; and (n) using said results for conducting said other portion of said call processing operations.

18. The method of claim 17 wherein steps (b) through (g) are performed only if a processing condition is detected in step (a) calling for performance of a supporting action.

19. The method of claim 18 wherein:

the CPE processing condition detectable in step (a) and the network processing condition detectable in step (h) are each selected from the group consisting of (i) a need for call control information, and (ii) a need for a supporting resource for use in said call processing operations;

the supporting action of step (a) is a determination of said call control information if (i) is the CPE processing condition detected, and a determination of directions for obtaining said supporting resource if (ii) is the CPE processing condition detected; and the other supporting action of step (h) is a determination of said call control information if (i) is the network processing condition detected, and a determination of directions for obtaining said supporting resource if (ii) is the network processing condition detected.

20. The method of claim 18 wherein the CPE processing condition detectable in step (a) is a need for a supporting resource for use in said call processing operations, and the supporting action includes incorporation of said supporting resource in said portion of said call processing operations, and wherein the results indicated in the response message forwarded to the CPE are a signal that the supporting resource has been so incorporated.

21. The method of claim 20 wherein the network processing condition detectable in step (h) is a need for a supporting resource for use in said call processing operations, and the other supporting action includes incorporation of said supporting resource in said other portion of said call processing operations, and wherein the results indicated in the response message forwarded to the network are a signal that the supporting resource has been so incorporated.

22. For use in an arrangement wherein telecommunications are exchanged between a switched telecommunications network and customer premise equipment (CPE) and wherein ancillary signaling messages are exchangeable between a signaling system of the CPE and a signaling system of the switched telecommunications network, a system for integrating and coordinating certain operations conducted in support of said exchanged telecommunications, comprising:

(a) a CPE signal transfer point disposed for receiving query messages from the CPE by way of the CPE signaling system and for receiving query messages from the network by way of the network signaling system and for redirecting said received query messages, at least some of said query messages eliciting information needed for furtherance of said operations;

(b) a CPE service logic provider disposed for receiving query messages directed to it from the CPE signal transfer point, said service logic provider being operative in response to a received query message to obtain the information elicited by that message, to formulate a corresponding CPE response message containing said information, and to send said CPE response message to the CPE signal transfer point, said CPE service logic provider being connected to the signal transfer point by the CPE signaling system;

(c) a network signal transfer point disposed for receiving query messages from the network by way of the network signaling system and for receiving query messages from the CPE by way of the CPE signaling system and for redirecting said received query messages, at least some of said query message eliciting information needed for furtherance of said operations;

(d) a network service logic provider disposed for receiving query messages directed to it from the network signal transfer point, said service logic provider being operative in response to a received query message to obtain the information elicited by that message, to formulate a corresponding network response message containing said information, and to send said network response message to the network signal transfer point, said network service logic provider being connected to the network signal transfer point by the network signaling system;

(e) wherein the CPE signal transfer point is further disposed for receiving said CPE response messages from the CPE service logic provider and for directing each CPE response message containing information needed for operations to be performed in the CPE to the CPE and for directing each response message containing information needed for operations to be performed in the network to the network; and (f) wherein the network signal transfer point is further disposed for receiving said network response messages from the network service logic provider and for directing each network response message containing information needed for operations to be performed in the network to the network and for directing each network response message containing information needed for operations to be performed in the CPE to the CPE.

23. The system of claim 22 wherein the information obtainable by the CPE service logic provider includes information relating to first auxiliary resources for use in said operations, wherein at least one of the query messages received by the CPE service logic provider elicits directions for use of at least some of said first auxiliary resources, and wherein a CPE response message corresponding to said query message includes said directions.

24. The system of claim 23 wherein the information obtainable by the network service logic provider includes information relating to second auxiliary resources for use in said operations, wherein at least one of the query messages received by the network service logic provider elicits directions for use of at least some of said second auxiliary resources, and wherein a network response message corresponding to said query message includes said directions.

25. The system of claim 24 wherein the information obtainable by the CPE service logic provider includes information relating to control and routing of the telecommunications exchanged and the information included in at least one of the CPE response messages includes at least some of said information when a query message to which that CPE response message corresponds elicits said information.

26. The system of claim 25 wherein the information obtainable by the network service logic provider includes other information relating to control and routing of the telecommunications exchanged and the information included in at least one of the network response messages includes at least some of said information when a query message to which the network response corresponds elicits said information.

27. The system of claim 26 wherein the CPE service logic provider is operative to perform CPE service logic programs for obtaining the information elicited by query messages received by the CPE service logic provider and wherein the network logic service provider is operative to perform network service logic programs for obtaining the information elicited by query messages received by the network service logic provider.

28. The system of claim 27 wherein the CPE includes a private branch exchange (PBX) and said PBX is arranged to receive at least some of the response messages directed to the CPE from the CPE signal transfer point, and wherein the network includes a telecommunications switch and said switch is arranged to receive at least some of the response messages directed to the network from the network signal transfer point.

29. The system of 28 wherein at least some of the query messages received by the network signal transfer point originate in the PBX and wherein at least some of the query messages received by the CPE signal transfer point originate in the telecommunications switch.

30. For use in processing a telecommunications call between customer premise equipment (CPE) and a switched telecommunications network of the type having a network signaling system and a network service provider productive of information which may be required for use in the processing of the call, a system for integrating and coordinating operations between the CPE and the network in support of the call, comprising:

(a) a CPE service provider for production of other information which may be required for use in the processing of the call;

(b) a CPE call control means for conducting at least a part of the processing of the call within the CPE, said call control means being operative (i) to detect a CPE processing condition requiring supplemental information in order to continue its processing of the call, and (ii) to generate a CPE request signaling message calling for the supplemental information;

(c) a CPE signaling system for conveying signaling messages within the CPE, said CPE signaling system interconnecting the CPE call control means and the CPE service provider; and (d) a signaling interface for interconnecting the CPE signaling system with the network signaling system and whereby the supplemental information may be obtained from the CPE service provider and the network service provider, and whereby (i) if the supplemental information is to be obtained from the CPE service provider, then the CPE request signaling message is passed to the CPE service provider, and (ii) if the supplemental information is to be obtained from the network service provider, then the CPE request signaling message is passed to the network service provider.

31. The system of claim 30 further including:

a network call control means for conducting at least a part of the processing of the call within the network, said call control means being operative (i) to detect a network processing condition requiring other supplemental information in order to continue its processing of the call, and (ii) to generate a network request signaling message calling for the other supplemental information; whereby, if the other supplemental information is to be obtained from the CPE service provider, then the network request signaling message is passed to the CPE service provider by way of the signaling interface.

32. The system of claim 31 wherein:

the CPE service provider is operative to provide a CPE response signaling message containing the supplemental information or the other supplemental information, depending on whether the CPE response signaling message is in response to the CPE request signaling message or the network request signaling message, respectively;

the network service provider is operative to provide a network response signaling message containing the supplemental information or the other supplemental information, depending on whether the network response message is in response to the CPE request signaling message or the network request signaling message, respectively;

the CPE response signaling message is passed to the CPE call control means if it is in response to the CPE request signaling message and to the network call control means if it is in response to the network request signaling message;

the network response signaling message is passed to the CPE call control means if it is in response to the CPE request signaling message and to the network call control means if it is in response to the network request signaling message; and each call control means is operative to continue its processing of the call upon receipt of either response signaling message.

33. The system of claim 32 wherein:

the CPE processing condition detectable by the CPE call control means is selected from the group consisting of (i) a need for use by the CPE of an auxiliary resource and directions for accessing that auxiliary resource in the processing of the call, and (ii) a need for call control information; and wherein the network processing condition detectable by the network call control means is selected from the group consisting of (iii) a need for use by the network of an auxiliary resource and directions for accessing that auxiliary resource in the processing of the call, and (iv) a need for call control information; and if condition (i) is met, the supplemental information received by the CPE call control means provides said directions; if condition (ii) is met, the supplemental information received by the CPE call control means provides said call control information; if condition (iii) is met, the other supplemental information received by the network call control means provides said directions; and if condition (iv) is met, the other supplemental information received by the network call control means provides said call control information.

34. The system of claim 33 wherein the CPE call control means is a PBX, the network call control means is a telecommunications switch, and the signaling interface includes a signal transfer point within the CPE interconnected by a data link to a signaling transfer point within the network.

35. The system of claim 34 wherein the auxiliary resource needed for processing the call is selected from the group consisting of a conference bridge, voice recognition equipment, and an announcement unit.

36. The system of claim 33 wherein the CPE service provider is a computer programmed to perform logic service programs for the production of said supplemental information and other supplemental information, the CPE call control means is a computer programmed to perform a call control function, the CPE signaling system includes a local area network (LAN) interconnecting the computers, the network call control means is a telecommunications switch, and the signaling interface includes an out-of-band signaling connection between the computer providing the call control means and the switch.

37. The system of claim 36 wherein the auxiliary resource needed for processing the call is selected from the group consisting of a conference bridge, voice recognition equipment, and an announcement unit.

38. The system of claim 37 herein the out-of-band signaling connection is the D-channel of an ISDN connection.

39. For use in an arrangement wherein telecommunications are exchanged between a switched telecommunications network and customer premise equipment (CPE) and wherein ancillary signaling messages are exchangeable between a signaling system of the customer premise equipment and a signaling system of the switched telecommunications network through at least one signal transfer point, a method for integrating and coordinating certain operations conducted in support of said exchanged telecommunications, comprising the steps of:

(a) at said at least one signal transfer point, receiving at least one query message eliciting a response message having information content required for furtherance of said operations, said information content to be determined from performance of a service logic program;

(b) if the service logic program is to be performed in the CPE, then passing the query message to a service logic provider within the CPE for performing the service logic program;

(c) if the service logic program is to be performed outside the CPE, then passing the query message to a service logic provider outside the CPE for performing the service logic program;

(d) generating the response message by the service logic provider to which the query message is passed, said response message providing said information content for use in performance of at least a part of said operations;

(e) if that part of the operations are to be performed in the CPE, then sending the response message to an element of the CPE; and (f) if that part of the operations are to be performed outside of the CPE, then sending the response message to an element outside of the CPE.

40. The method of claim 39 including the further step of:

(g) performing that part of the operations to which the response message pertains, using the information contained in the response message for such performance.

41. The method of claim 40 wherein the certain operations conducted in support of said exchanged telecommunications require a series of sub-operations for completion and wherein to provide such sub-operations steps (a) through (g) are repeated until said certain operations are complete.

42. The method of claim 40 wherein in step (b) the query message is passed to the service logic provider of the CPE by way of the CPE signaling system, and in step (c) the query message is passed to the service logic provider outside the CPE by way of the signaling system of the switched telephone network.

43. The method of claim 40 wherein the query message is received from the CPE.

44. The method of claim 40 wherein the query message is received from outside the CPE.

45. The method of claim 40 wherein the telecommunications exchanged include telephone calls, and the query message is a request for information for controlling a call and the response message provides such information.

46. The method of claim 40 wherein the telecommunications exchanged include telephone calls, and the query message is a request for an assignment of available resources required for processing a call.

47. A method for integrating and coordinating call processing operations conducted in support of a telecommunications call placed between customer premise equipment (CPE) and a telecommunications network of the type having a signaling system by which signaling messages are exchanged with various network service providers, comprising the steps of:

(a) if a CPE processing condition occurs that requires performance of a supporting action productive of results required for conducting at least a portion of the call processing operations to be carried out within the CPE, then performing substeps including the following:

(i) formulating a CPE request signaling message for requesting performance of the supporting action;

(ii) if the supporting action is to be performed within the CPE, then forwarding the CPE request signaling message to a CPE service provider having a capability for causing said supporting action to be performed;

(iii) if the supporting action is to be performed without the CPE, then forwarding the CPE request signaling message to a selected one of the network service providers having a capability for causing said supporting action to be performed;

(iv) causing the supporting action to be performed by the service provider that receives the CPE request signaling message and determining the results of said supporting action;

(v) formulating a response message indicating said results and forwarding said response message to the CPE; and (vi) using said results in furtherance of said call processing operations to be carried out within the CPE; and (b) if a network processing condition occurs that requires performance of another supporting action productive of results required for conducting at least a portion of the call processing operations to be carried out within the network, then performing substeps including the following:

(i) formulating a network request signaling message for requesting performance of said other supporting action;

(ii) if the other supporting action is to be performed within the CPE, then forwarding the network request signaling message to a CPE service provider having a capability for causing said other supporting action to be performed;

(iii) if the other supporting action is to be performed without the CPE, then forwarding the network request signaling message to a selected one of the network service providers having a capability for causing said other supporting action to be performed;

(iv) causing the other supporting action to be performed by the service provider that receives the network request signaling message and determining the results of said other supporting action;

(v) formulating a response message indicating said results and forwarding said response message to the network; and (vi) using said results in furtherance of said call processing operations to be carried out within the network.

48. The method of claim 47 wherein: the CPE processing condition detectable in step (a) and the network processing condition detectable in step (b) are each selected from the group consisting of (A) a need for call control information, and (B) a need for a supporting resource for use in said call processing operations;

the supporting action of step (a) is a determination of said call control information if (A) is the CPE processing condition detected, and a determination of directions for obtaining said supporting resource if (B) is the CPE processing condition detected; and the other supporting action of step (b) is a determination of said call control information if (A) is the network processing condition detected, and a determination of directions for obtaining said supporting resource if (B) is the network processing condition detected.

49. The method of claim 47 wherein the CPE processing condition detectable in step (a) is a need for a supporting resource for use in said call processing operations, and the supporting action includes incorporation of said supporting resource in said portion of said call processing operations, and wherein the results indicated in the response message forwarded to the CPE are a signal that the supporting resource has been so incorporated.

50. The method of claim 49 wherein the network processing condition detectable in step (b) is a need for a supporting resource for use in said call processing operations, and the other supporting action includes incorporation of said supporting resource in said other portion of said call processing operations, and wherein the results indicated in the response message forwarded to the network are a signal that the supporting resource has been so incorporated.

51. For use in an arrangement wherein telecommunications are exchanged between a switched telecommunications network and customer premise equipment (CPE) and wherein ancillary signaling messages are exchangeable between a CPE signaling system and a network signaling system through at least one signaling transfer point, a method for integrating and coordinating certain operations conducted in support of said exchanged telecommunications, comprising the steps of:

(a) at said at least one signal transfer point, receiving a query message to which a response message is required for furtherance of said operations;

(b) if the response message is to be determined by service logic performed in the CPE, then passing the query message to a service logic provider of the CPE;

(c) if the response message is to be determined by service logic performed outside the CPE, then passing the query message to a service logic provider outside of the CPE;

(d) generating the response message by the service logic provider to which the query message is passed, said response message including information for use in performance of at least a part of said operations;

(e) if that part of the operations are to be performed in the CPE, then sending the response message to an operative element of the CPE; and (f) if that part of the operations are to be performed outside of the CPE, then sending the response message to an operative element outside of the CPE.

52. The method of claim 51 including the further step of:

(g) performing that part of the operations to which the response message pertains, using the information contained in the response message for such performance.

53. The method of claim 52 wherein the certain operations conducted in support of said exchanged telecommunications require a series of sub-operations for completion and wherein to provide such sub-operations steps (a) through (f) are repeated until said operations are complete.

54. The method of claim 52 wherein the query message is received from the CPE.

55. The method of claim 52 wherein the query message is received from outside the CPE.

56. The method of claim 52 wherein in step (b) the query message is passed to the service logic provider of the CPE by way of the CPE signaling system, and in step (c) the query message is passed to the service logic provider outside the CPE by way of the signaling system of the switched telephone network.

57. The method of claim 52 wherein the telecommunications exchanged include telephone calls and the query message is a request for information for controlling a call and the response message provides such information.

58. The method of claim 52 wherein the telecommunications exchanged include telephone calls and the query message is a request for an assignment of available resources required for processing a call.

59. In connection with customer premise equipment (CPE) deployed to handle telecommunications calls exchanged with a telecommunications network having advanced intelligent networking (AIN) capabilities, including therefor a common channel signaling (CCS) system and an integrated service control point (ISCP) operative to perform certain service programs the results of which are used to facilitate the provision of telecommunications services, a system for integrating and coordinating operations in support of the calls, comprising:

(a) a CPE service control point (CPE SCP) operative within the CPE to perform SCP service programs and to provide results from the performance of any one of said SCP service logic programs in a CPE response signaling message;

(b) a CPE service switching point (CPE SSP) for processing the telecommunications calls within the CPE and operative in processing each call to (i) detect at least one CPE processing condition that requires performance of one of said service programs in order to continue the processing for the call, and to (ii) generate a CPE request signaling message calling for performance of said service program;

(c) a CPE signaling system by which signaling messages are conveyed within the CPE; and (d) a CPE signal transfer point (CPE STP) for compatibly interconnecting the CPE signaling system with the CCS system of the network whereby (i) if the required service program for the call being processed is to be performed in the CPE SCP then the CPE request signaling message is directed to the CPE SCP, and (ii) if the required service program for the call being processed is to be performed in the ISCP, then the CPE request signaling message is directed to the ISCP.

60. The system of claim 59 wherein the ISCP is operative to provide the results from its performance of any one of said ISCP service programs in a network response message, and wherein the CPE SSP is operative to receive the response signaling messages from the CPE SCP and from the ISCP by way of the CPE STP and the CPE signaling system and upon receipt of the CPE response signaling message or the network response signaling message for the call being processed to continue processing that call.

61. The system of claim 60 further including a network service switching point (SSP) for processing the telecommunications calls within the network and operative in processing each call to (i) detect at least one network processing condition that requires performance of another one of said service programs in order to continue processing for the call, and to (ii) generate a network request signaling message calling for performance of the other service program, and whereby, if the required other service program for the call being processed is to be performed in the CPE SCP, then the network request signaling message is directed to the CPE SCP provider by way of the CPE STP.

62. The system of claim 61 wherein the network SSP is operative to receive response signaling messages from the CPE SCP and from the ISCP and upon receipt of the CPE response signaling message or the network response signaling message for the call being processed to continue processing that call.

63. The system of claim 62 wherein the CPE processing condition detectable by the CPE SSP is a need for an auxiliary resource for use by the CPE in processing the call, wherein the required service program provides CPE directions for accessing that auxiliary resource, and wherein the response signaling message received by the CPE SSP includes said CPE directions.

64. The system of claim 63 wherein the auxiliary resource needed for use by the CPE in processing the call is located within the network.

65. The system of claim 63 wherein the network processing condition detectable by the network SSP is a need for an auxiliary resource for use by the network in processing the call, wherein the required other service program provides network directions for accessing that auxiliary resource, and wherein the response signaling message received by the network SSP includes said network directions.

66. The system of claim 65 wherein the auxiliary resource needed for use by the network in processing the call is located within the CPE.

67. The system of claim 62 wherein the CPE processing condition detectable by the CPE SSP is a need for information for use by the CPE in controlling the call and wherein the response signaling message received by the CPE SSP includes that information.

68. The system of claim 67 wherein the network processing condition detectable by the network SSP is a need for information for use by the network in controlling the call and wherein the response signaling message received by the network SSP includes that information.

69. The system of claim 62 wherein the CPE SSP is programmed to detect as CPE processing conditions (i) a need for an auxiliary resource for use by the CPE in processing the call, and (ii) a need for information for use by the CPE in controlling the call; and wherein the network SSP is programmed to detect as network processing conditions (iii) a need for an auxiliary resource for use by the network in processing the call, and (iv) a need for information for use by the network in controlling the call.

70. The system of claim 69 wherein if condition (i) is met, then the service program performed provides directions for accessing an auxiliary resource for use by the CPE and the response signaling message received by the CPE SSP includes an indication that the need for such an auxiliary resource has been satisfied; wherein if condition (ii) is met, then the response signaling message received by the CPE SSP includes the information needed by the CPE; wherein if condition (iii) is met, then the other service program performed provides directions for accessing an auxiliary resource for use by the network and the response signaling message received by the network SSP includes an indication that the need for such an auxiliary resource has been satisfied; and wherein if condition (iv) is met, then the response signaling message received by the network SSP includes the information needed by the network.

71. The system of claim 70 wherein the auxiliary resource needed for use by the CPE in processing the call is located within the network, and wherein the auxiliary resource needed for use by the network in processing the call is located within the CPE.

72. The system of claim 71 wherein the CPE SSP is included in a private branch exchange (PBX) and the network SSP is a telecommunications switch located in a central office of the network and wherein the PBX is interconnected to the central office.

73. The system of claim 72 wherein the auxiliary resource needed for use by the CPE in processing the call is an adjunct device accessible by the telecommunications switch.

74. For use in an arrangement wherein telecommunications are exchanged between a switched telecommunications network and customer premise equipment (CPE) and wherein ancillary signaling messages are exchangeable between a CPE signaling system and a network signaling system, a method for integrating and coordinating certain operations conducted in support of said exchanged telecommunications, comprising the steps of:

(a) at a signal transfer point of the CPE signaling system, receiving a query message to which a response message is required for furtherance of said operations;

(b) if the response message is to be determined by service logic performed in the CPE, then passing the query message to a service logic provider of the CPE;

(c) if the response message is to be determined by service logic performed outside the CPE, then passing the query message to a service logic provider outside of the CPE;

(d) generating the response message by the service logic provider to which the query message is passed, said response message including information for use in performance of at least a part of said operations;

(e) if that part of the operations are to be performed in the CPE, then sending the response message to an operative element of the CPE; and (f) if that part of the operations are to be performed outside of the CPE, then sending the response message to an operative element outside of the CPE.

75. The method of claim 74 including the further step of:

(g) performing that part of the operations to which the response message pertains, using the information contained in the response message for such performance.

76. The method of claim 75 wherein the certain operations conducted in support of said exchanged telecommunications require a series of sub-operations for completion and wherein to provide such sub-operations steps (a) through (g) are repeated until said operations are complete.

77. The method of claim 75 wherein the query message is received from the CPE.

78. The method of claim 75 wherein the query message is received from outside the CPE.

79. The method of claim 75 wherein in step (b) the query message is passed to the service logic provider of the CPE by way of the CPE signaling system, and in step (c) the query message is passed to the service logic provider outside the CPE by way of the signaling system of the switched telephone network.

80. The method of claim 79 wherein the telecommunications exchanged include telephone calls and the query message is a request for information for controlling a call and the response message provides such information.

81. The method of claim 79 wherein the telecommunications exchanged include telephone calls and the query message is a request for an assignment of available resources required for processing a call.

* * * * *